United States Patent Office 3,716,617
Patented Feb. 13, 1973

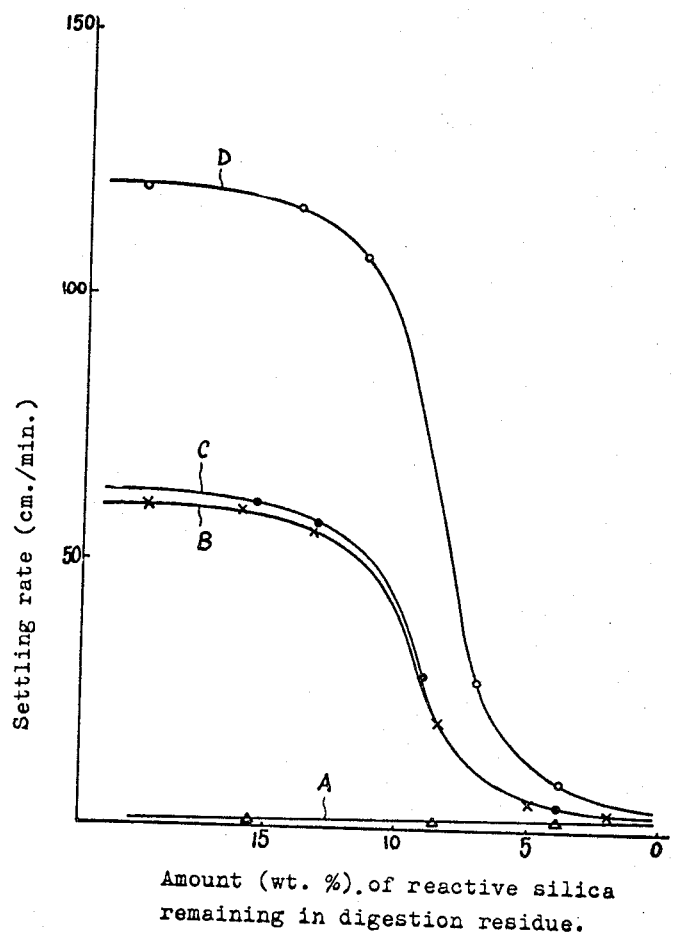

---

3,716,617
PROCESS FOR PRODUCING ALUMINA
Tsurumi Oku, Niihama, Akio Suzuki, Kobe, and Nobuyoshi Tawara and Kenji Niwa, Niihama, Japan, assignors to Sumitomo Chemical Co., Ltd., Osaka, Japan
Filed Apr. 13, 1970, Ser. No. 27,475
Claims priority, application Japan, Apr. 17, 1969, 44/30,037
Int. Cl. C01f 7/06
U.S. Cl. 423—121                     11 Claims

ABSTRACT OF THE DISCLOSURE

Improved process for producing alumina according to the Bayer process wherein the digestion residue is separated from the sodium aluminate solution, resulting from the digestion of an alumina-containing ore, by using a synthetic organic high molecular weight flocculant and conducting the separation only when at least 5% by weight of reactive silica remains in the digestion residue. With this process, soda concentrations higher than 70 g./l. may be utilized for digestion.

---

This invention relates to an improved process for producing alumina. More particularly, the present invention relates to a process for separating a digestion residue from a slurry comprising sodium aluminate and a digestion residue resulting from the digestion of an alumina-containing ore with an alkali solution.

Before going into an explanation about the invention, some technical terms to be used throughout the specification and claims are defined below.

The term "quartz" means nonreactive silica present in the form of free crystalline silicon dioxide in an alumina-containing ore. The term "reactive silica" means silica present as clay and/or any other silicate in an alumina-containing ore. The term "digestion residue" means solid components in a slurry which has not yet been subjected to desilication treatment. The term "red mud" means solid components present in a slurry after the desilication treatment. The "reactive silica remaining in the digestion residue (R%)" is determined by the following formula:

$$R = A - 1.613B$$

wherein A is the content (percent by weight) of all reactive silica remaining in the digestion residue as determined according to JIS—M—8361 (1963) and B is the content (percent by weight) of combined soda remaining in the digestion residue as determined according to JIS—R—3101 (1965).

As well known in the art, the production of alumina from a proper alumina-containing ore (for example, from bauxite according to the so-called Bayer process) is carried out in the following manner. The crushed bauxite is first mixed with caustic soda solution and is digested in an autoclave to extract the alumina component in the bauxite in the form of a sodium aluminate solution, and is then subjected to desilication wherein the reactive silica dissolved simultaneously with the extraction of the alumina component is caused to react with a part of the alumina and alkali solution so as to form insoluble sodarite or zeorite. Then the slurry comprising the sodium aluminate solution and red mud resulting from the desilication is subjected to a red mud separating step to separate the sodium aluminate and red mud. Finally, the separated sodium aluminate solution is subjected to a precipitating step wherein it is decomposed to aluminum hydroxide. The most serious problem in this process, however, is that the separation of sodium aluminate solution and red mud from each other is very difficult.

It has been disclosed in Japanese Pat. No. 142,652 to promote the separation of sodium aluminate and red mud from each other by adding a natural organic high molecular weight substance (e.g. starch) as a flocculant. This method has been effective to a certain extent and industrially used, but is not fully satisfactory because the settling rate is still low, e.g. 0.1 to 3 cm./min. Thereafter, instead of such natural organic high molecular weight flocculant various synthetic organic high molecular weight flocculant has been developed to further promote the separation of sodium aluminate and red mud from each other, and some of them have been already actually used (for example, refer to U.S. Pat. No. 3,390,959). Such synthetic organic flocculants have some drawbacks, in that the effect of sedimentation is not noticeably higher than that of starch, when the soda concentration ($Na_2O$ g./l.) in the sodium aluminate solution is higher than 70 to 80 g./l. Therefore, it is necessary to carry out the separation within a soda concentration not higher than 70 g./l. Further, the synthetic organic high molecular weight flocculant is not resistant to stirring in the sodium aluminate solution, so that the chain of the synthetic organic high molecular weight flocculant is broken unless the separation is carried out within several minutes after the addition of the flocculant. As a result the effect of sedimentation is not promoted. Therefore, it is necessary to add such flocculant just before the separation. However, even with this method, the red mud separating effect is not satisfactory.

An object of the present invention is to provide an improved process for producing alumina.

A further object is to provide a process for effectively separating a digestion residue from a slurry comprising sodium aluminate solution and digestion residue resulting from the digestion of an alumina-containing ore according to the Bayer process.

Other objects will become apparent from the following description.

As a result of extensive studies on the separation of a digestion residue from a sodium aluminate solution obtained by treating an alumina-containing ore with an alkali solution, we have found that the effect of sedimentation of a synthetic organic high molecular weight flocculant is correlated with the reactive silica remaining in the digestion residue. Based on this finding, we have developed a method wherein a synthetic organic high molecular weight flocculant can be effectively used even at a soda concentration higher than 70 g./l. and wherein the settling rate is remarkably high under a very wide range of soda concentration, i.e. not only below 70 g./l. but also higher than 70 g./l. This fact has never been observed in any conventional method with the use of a natural organic high molecular weight flocculant and therefore is quite surprising.

According to the present invention, there is provided a method for separating a digestion residue by use of a synthetic organic high molecular weight flocculant from a sodium aluminate solution resulting from the digestion of an alumina-containing ore, which comprises conducting the separation while at least 5% by weight of the reactive silica has not yet been dissolved out of the digestion residue.

In carrying out the method of this invention, there can be used any alumina-containing ore, for example, bauxite high in the reactive silica content (more than 5%), bauxite low in the reactive silica content (less than 5%) and laterite. However, it is preferable to use bauxite high in the reactive silica content or laterite.

The grain size of the alumina-containing ore usable is not critical but generally the larger the grain size the better the effect.

It is generally preferable to carry out the digestion in working this invention by the Bayer process.

The soda concentration is not critical but generally an $Na_2O$ concentration of 80 to 200 g./l. may be used. It is also possible to use a concentration outside the above range but it is not preferable from an economical point of view. Preferably an $Na_2O$ concentration of 100 to 140 g./l. is used.

When the temperatured during the extraction of an alumina component from bauxite is high, digestion time required may be short but, on the other hand, the rate of dissolution of the reactive silica becomes greater, so the rate of variation of the reactive silica content in the digestion residue becomes quick and the operation becomes difficult. Further, the desilication reaction is accelerated and the alumina and alkali solution are lost. On the other hand, if the digestion temperature is low, the desired high alumina concentration in the sodium aluminate solution can not be obtained. Therefore, the digestion temperature is usually 90 to 150° C., preferably 110 to 140° C.

The pressure is not critical and the digestion may be conducted under any proper pressure.

The autoclave for conducting the digestion may be provided with a heating apparatus such as a spiral tube or steam jacket through which steam is passed to heat the contents. Alternatively, a heater such as a double tube heat exchange may be set in front of the autoclave in the process flow but the autoclave itself is not provided with any heating apparatus. Further, when the digestion is carried out at a high temperature, the digestion time is short and therefore preferably a tubular reactor is used.

The synthetic organic high molecular weight flocculant may be any known one which can be used for the separation of digestion residue. Examples of such flocculants are polymers of acrylic acid, methacrylic acid and itaconic acid; copolymers thereof with monomers copolymerizable therewith; salts such as ammonium salt and sodium salt of these polymers and copolymers; polyacrylic acid and polymethacrylic acid derivatives such as dimethylaminoethyl polyacrylates, dimethylaminoethyl polymethacrylates and their quaternary ammonium salts; hydrolyzed polyacrylonitrile and their salts; polyacrylamides and their partially hydrolyzed products and their salts; polymers of maleic acid, maleic acid derivatives and copolymers thereof with vinylic derivatives copolymerizable therewith and their salts; sodium salts of polyvinylpyrrolidone, polyvinylpiperidone and sulfonated polystyrene; quaternary ammonium salts of aminoated polystyrenes; water-soluble polyamine polymers and the compounds mentioned in U.S. Pat. No. 3,390,959. Particularly preferable are polyacrylic acids, salts of polyacrylic acids, polyacrylamides, partially hydrolyzed polyacrylamides, salts of polyacrylamides, salts of partially hydrolyzed polyacrylamides and mixtures of any two or more of them.

These synthetic organic high molecular weight flocculants can be used singly or in admixture with each other. Particularly, if two or more of these flocculants are used in combination, more favorable results are obtained. The homopolymers and copolymers have a molecular weight of more than 50,000, preferably more than 500,000. The amount of the flocculant to be added to the digestion product may vary depending on the synthetic organic high molecular weight flocculant, but is usually more than 0.005% by weight based on the amount of solid particles suspended in the slurry. However, the settling rate does not become high in proportion to the amount of addition above a certain level. Therefore, from a commercial point of view, it is preferable to use the flocculant in an amount of 0.01 to 2.0% by weight based on the amount of solid particles suspended in the slurry.

In the method of the present invention, the time when the digestion residue is separated in the presence of a synthetic organic high molecular weight flocculant is important. Thus the separation should be conducted while the reactive silica is present in an amount of at least 5%, preferably at least 7%, most preferably at least 10% by weight in the digestion residue contained in the slurry resulting from the digestion of an alumina-containing ore. The period while the content of the reactive silica remaining in the digestion residue is more than 5% by weight varies depending on the quality of the raw material (alumina-containing ore) and the digestion conditions, but can be easily determined by testing the digestion of the same raw material in advance and measuring the reactive silica remaining in the digestion residue with the lapse of time. For example, when bauxite of a composition of 45% by weight $Al_2O_3$ (93% by weight gibbsite, 7% by weight boehnite) and 8% by weight of R—$SiO_2$ is digested at 110° C. and at 140° C., respectively, the reactive silica remaining in the digestion residue will become about 5% by weight in about 10 minutes and in about 60 seconds, respectively.

Therefore, in the digestion at 110° C., the digestion product should be subjected to a separating step within 10 minutes, while at 140° C., within 60 seconds.

That is to say, the alumina component in the alumina-containing ore is high in the rate of digestion with an alkali solution so that the greater part of it is dissolved out instantly. On the other hand, the relative amount of the reactive silica remaining in the digestion residue increases until the greater part of alumina component is dissolved out and then reduces. The silica dissolved out of the residue is precipitated as combined with the alumina and alkali components in the solution and therefore causess the loss of alumina component. Therefore, it is desirable to carry out separation at the time when silica is dissolved out as little as possible.

Therefore, it is desirable to separate the digestion residue from the sodium aluminate solution at the time when the amount of the reactive silica remaining in the digestion residue is higher than 5% by weight, up to a maximum value.

The addition of the synthetic organic high molecular weight fluocculant may be conducted in any suitable manner provided that the additional is made at the time when the amount of reactive silica remaining in the digestion residue is higher than 5% by weight. Thus, for example, the fluocculant may be mixed in the raw material ore in advance and then, after the digestion, the separation is conducted at a proper time when the amount of reactive silica remaining in the digestion residue is higher than 5% by weight. Alternatively, it may be added just before the digestion residue is separated.

The sodium aluminate solution separated from the slurry comprising sodium aluminate solution and digestion residue by the above-mentioned treatment is then subjected to precipitating step to obtain aluminum hydroxide after or without being desilicated. If the aluminate solution is desilicated, the resulting product is subjected to separation prior to being fed to the precipitating step.

It is also possible in the present invention to use an inorganic salt such as $Ca(OH)_2$, $CaO$, $Ba(OH)_2$ or $BaCl_2$ or any natural organic high molecular weight flocculant together with the above-mentioned synthetic organic high molecular weight fluocculant.

The present invention has the following advantages:

(1) It is possible to advantageously produce aluminum hydroxide from bauxite high in the reactive silica content have hitherto been considered to be not economically useful as a material for the production of aluminum hydroxide.

(2) An effect of sedimentation several ten to several hundred times as high as one with any conventional synthetic organic high molecular weight fluocculant can be realized.

(3) The influence of the soda concentration on the synthetic organic high molecular weight fluocculant is eliminated so that the flocculant can be effectively used in a soda concentration range within which the synthetic flocculant has hitherto been considered not useful.

(4) A sodium aluminate solution and digestion residue can be separated from each other within such short time that the loss of alumina and soda can be reduced lower than in a conventional method, wherein all the reactive silica is made to react with alumina and soda so as to be sodarite or zeorite and then the separation is conducted. Further, the desilication operation is rendered very simple.

Now, the present invention will be explained with reference to accompanying drawing.

This drawing is a graph showing an example of the relationship between the amount of reactive silica remaining in the digestion residue and the constant settling rate with the use of an organic high molecular weight fluocculant in separating a digestion residue from sodium aluminate solution resulting from the digestion of bauxite with an alkali solution.

The invention will be further explained by means of the following examples. However, it is not intended to limit the invention thereby, and such examples can be modified within the scope of the present invention.

EXAMPLE 1

Into an autoclave (1 liter in volume) there were charged 75.2 g. of bauxite of a composition shown in Table 1 crushed to 100 mesh size and 0.8 liter of a sodium aluminate solution ($Na_2O$ 140 g./l., $Al_2O_3$ 87.5 g./l.). The autoclave was sealed and heated to 110° C. while being stirred to conduct digestion at this temperature for 5 minutes. The resulting sodium aluminate solution contained 134.3 g./l. of $Na_2O$, and 122.4 g./l. of $Al_2O_3$. The reactive silica remaining in the digestion residue was 15.5% by weight.

Then the digestion slurry was transferred to a cylinder (1 liter in volume) kept at 70° C. A flocculant consisting of 0.02% by weight of sodium polyacrylate (average molecular weight 1,000,000) and 0.02% by weight of polyacrylamide (average molecular weight 12,000,000) based on the digestion residue was added to the slurry comprising sodium aluminate solution and digestion residue. The settling rate was 61.2 cm./min. For comparison, when 0.25% by weight of starch was added instead of the above fluocculant, the setting rate was 0.34 cm./min.

TABLE 1.—Composition of bauxite (percent by weight)

| | |
|---|---|
| Loss of ignition | 25.23 |
| $Al_2O_3$ | 46.52 |
| $Fe_2O_3$ | 17.18 |
| $TiO_2$ | 0.50 |
| Total $SiO_2$ | 10.31 |
| Reactive $SiO_2$ | 8.50 |

EXAMPLE 2

A digestion slurry was obtained by substantially the same process as in Example 1 except that the digestion time and the amount of the reactive silica remaining in the digestion residue were varied. The settling rate was measured by the same process as in Example 1. The results are shown in Table 2. Further, these results are also shown by the curve B in the drawing.

For comparison, the results obtained by using starch are also shown by the curve A in the drawing.

TABLE 2

| Digestion time (min.) | Concentration of sodium aluminate solution | | Reactive silica remaining in the digestion residue (percent by weight) | Settling rate (cm./min.) |
|---|---|---|---|---|
| | $Na_2O$ (g./l.) | $Al_2O_3$ (g./l.) | | |
| 5 | 134.3 | 122.4 | 15.50 | 61.2 |
| 10 | 132.8 | 122.9 | 13.27 | 57.0 |
| 15 | 131.5 | 122.9 | 9.43 | 28.9 |
| 20 | 131.2 | 121.7 | 8.62 | 23.7 |
| 45 | 132.4 | 120.2 | 4.05 | 4.62 |

EXAMPLE 3

Into an autoclave (1 liter in volume) there were charged 75.2 g. of bauxite of a composition shown in the previous Table 1 crushed to 100 mesh size and 0.8 liter of a sodium aluminate solution ($Na_2O$ 120.0 g./l., $Al_2O_3$ 74.8 g./l.). The autoclave was sealed and quickly heated to 130° C. while being stirred to conduct digestion at this temperature for 1 minute. The resulting sodium aluminate contained 114.3 g./l. of $Na_2O$ and 109.5 g./l. of $Al_2O_3$. The reactive silica remaining in the digestion residue was 16.1% by weight.

Then the digestion slurry was transferred to a cylinder kept at 70° C. A flocculant consisting of 0.02% by weight of sodium polyacrylate (average molecular weight 1,000,-000) and 0.02% by weight of polyacrylamide (average molecular weight 12,000,000) based on the digestion residue was added to the slurry comprising the sodium aluminate solution and digestion residue. The settling rate was 59.1 cm./min.

EXAMPLE 4

A digestion slurry was obtained by substantially the same process as in Example 3 except that the digestion time and the amount of the reactive silica remaining in the digestion residue was varied. The settling rate was measured by the same process as is mentioned above. The results are shown by the curve C in the drawing. The curve D is the settling rate obtained in the same manner as explained above except that bauxite of a grain size of 35 mesh was used.

EXAMPLE 5

The settling rate in respect of the digestion slurry obtained by the same process as in Example 3 was measured in the case of using each of the synthetic organic agents shown in Table 3. The results are shown in Table 3.

TABLE 3

| Synthetic organic high molecular weight flocculant | Amount of addition to digestion residue (percent by weight) | Settling rate (cm./min.) |
|---|---|---|
| Polyacrylamide ($\bar{P}$=12,000,000) | 0.04 | 54 |
| Polyacrylic acid ($\bar{P}$=1.100,000) | 0.04 | 44 |
| Polyvinyl pyridine ($\bar{P}$=1,000,000) | 0.04 | 52 |
| Polyvinylbenzene sulfonic acid ($\bar{P}$=6,000,000) | 0.04 | 37 |
| Sulfonated polystyrene ($\bar{P}$=600,000) | 0.04 | 28 |
| Water-soluble polyamine ($\bar{P}$=300,000) | 0.04 | 13 |
| Himoloc [1] | 0.04 | 23 |
| Polyacrylamide-maleic acid copolymer ($\bar{P}$=1,000,000) | 0.04 | 40 |

[1] Trade name of a water-soluble polyamine produced by Kyoritsu Organic Industrial Laboratory.

As apparent from the above example, it will be recognized that the settling rate begins to quickly increase when the amount of the reactive silica remaining in the digestion residue is 5% by weight in the case of using a synthetic organic high molecular weight flocculant.

Further, it will be observed from the curve A that no such phenomenon is recognized in the case of using a natural organic high molecular weight flocculant.

What we claim is:

1. A process for separating a digestion residue from a slurry containing sodium aluminate resulting from digestion of an alumina-containing ore with an alkali solution which comprises conducting the separation in the presence of a synthetic organic high molecular weight flocculant when the reactive silica content of the digestion residue is at least 5% by weight.

2. The process according to claim 1, wherein the digestion is conducted with a caustic soda solution having an $Na_2O$ concentration of 80 to 200 g./l.

3. The process according to claim 1, wherein the digestion is conducted with a caustic soda solution having an $Na_2O$ concentration of 100 to 140 g./l.

4. The process according to claim 1, wherein the digestion is conducted at a temperature of 90 to 150° C.

5. The process according to claim 1, wherein the digestion is conducted at a temperature of 110 to 140° C.

6. The process according to claim 1, wherein said synthetic organic high molecular weight flocculant is selected from the group consisting of polyacrylic acids, salts of polyacrylic acids, polyacrylamides, partially hydrolyzed polyacrylamides, salts of polyacrylamides, salts of partially hydrolyzed polyacrylamides and mixtures thereof.

7. The process according to claim 1, wherein said synthetic organic high molecular weight flocculant is present in an amount more than 0.005% by weight based on the amount of solid particles suspended in the slurry.

8. The process according to claim 1, wherein said separation is conducted while the amount of the reactive silica remaining in the digestion residue is 7% by weight.

9. The process according to claim 1, wherein said separation is conducted while the amount of the reactive silica remaining in the digestion residue is 10% by weight.

10. The process according to claim 1, wherein said synthetic organic high molecular weight flocculant is present in an amount of 0.01 to 2.0% by weight based on the amount of solid particles suspended in the slurry.

11. The process according to claim 1, wherein the flocculant is added to the slurry after digestion has commenced.

References Cited

UNITED STATES PATENTS

| 3,085,853 | 4/1963 | Lesinski et al. | 23—52 |
| 3,401,009 | 9/1968 | Gittos | 23—52 |
| 3,445,187 | 5/1969 | Siebert | 23—143 |
| 3,365,273 | 1/1968 | Siemers | 23—143 |
| 3,397,953 | 8/1968 | Galvin et al. | 23—143 |
| 3,390,959 | 7/1968 | Siebert | 23—143 |

FOREIGN PATENTS

| 17,303 | 9/1963 | Japan | 23—52 |

GEORGE O. PETERS, Primary Examiner

U.S. Cl. X.R.

423—112